United States Patent [19]
Ritchie et al.

[11] Patent Number: 5,988,658
[45] Date of Patent: Nov. 23, 1999

[54] TOOL BOX CARRIER

[75] Inventors: Fred Philip Ritchie, Waterloo; Gregory Jon Holcomb, Cedar Falls; David Allen Trower, Waterloo, all of Iowa

[73] Assignee: Waterloo Industries, Inc., Waterloo, Iowa

[21] Appl. No.: 08/855,863

[22] Filed: May 12, 1997

[51] Int. Cl.⁶ ...................................................... B32B 1/00
[52] U.S. Cl. ................................... 280/47.26; 280/47.17; 280/79.5
[58] Field of Search ........................... 280/47.131, 47.17, 280/47.24, 47.26, 47.315, 47.27, 79.2, 79.3, 79.4, 79.5, 79.6, 655.1; 220/22.83, 22.86, 737, 756, 758, 759; 190/18 A, 18 R; 206/545

[56] References Cited

U.S. PATENT DOCUMENTS

| | | | |
|---|---|---|---|
| 4,724,681 | 2/1988 | Bartholomew | 280/47.17 |
| 4,846,493 | 7/1989 | Mason | 280/655 |
| 4,976,448 | 12/1990 | Wickersham | 280/47.2 |
| 5,228,706 | 7/1993 | Boville | 280/43.22 |
| 5,313,817 | 5/1994 | Meinders | 280/47.26 |
| 5,518,139 | 5/1996 | Trower et al. . | |
| 5,657,894 | 8/1997 | Bowen | 220/339 |
| 5,782,325 | 7/1998 | O'Shea | 190/18 A |
| 5,806,867 | 9/1998 | Hampton | 280/79.2 |

OTHER PUBLICATIONS

U.S. Patent 4,369,822 (abbreviated), Rice, date Jan. 25, 1983 (Internet Jun. 5, 1997) 2 sheets.
Sears 1997–1998 Power & Hand Tool Catalog, p. 17.
Igloo Corp. sales page (Ice Chests on Wheels).
Luggage sales sheet (p. 32).
Globe Ind. Equipment Catalog, p. 229.
Global Equipment Co. catalog, p. 85.
Igloo Marine sales page (Go Igloo!), p. 80.
Igloo Marine sales page, p. 78.
Igloo Marine sales page ("Ice Chests on Wheels"), p. 66.
Igloo Marine sales page (Go Igloo!), p. 90.
ATD catalog page.
Rubbermaid Incorporated page.
Hodge Hand Trucks brochure page.
Stack–On, p. 10.
Zag Complete Storage Solutions, hardware (Internet printout) May 29, 1997.
Zag Complete Storage Solutions, garden, Load n Roll—Lawn Cart (Internet printout) May 29, 1997.
Zag Complete Storage Solutions, garden (Internet printout) May 29, 1997.
Zag Complete Storage Solutions, garden, Move 'n Groove (Internet printout) May 29, 1997.

Primary Examiner—J. J. Swann
Assistant Examiner—Kevin McKinley
Attorney, Agent, or Firm—Banner & Witcoff, Ltd.

[57] ABSTRACT

A carrier for a work box or tub includes a support ring made from opposed connected braces with telescopic handle attached at one end and wheels attached at the opposite end of the support ring.

5 Claims, 5 Drawing Sheets

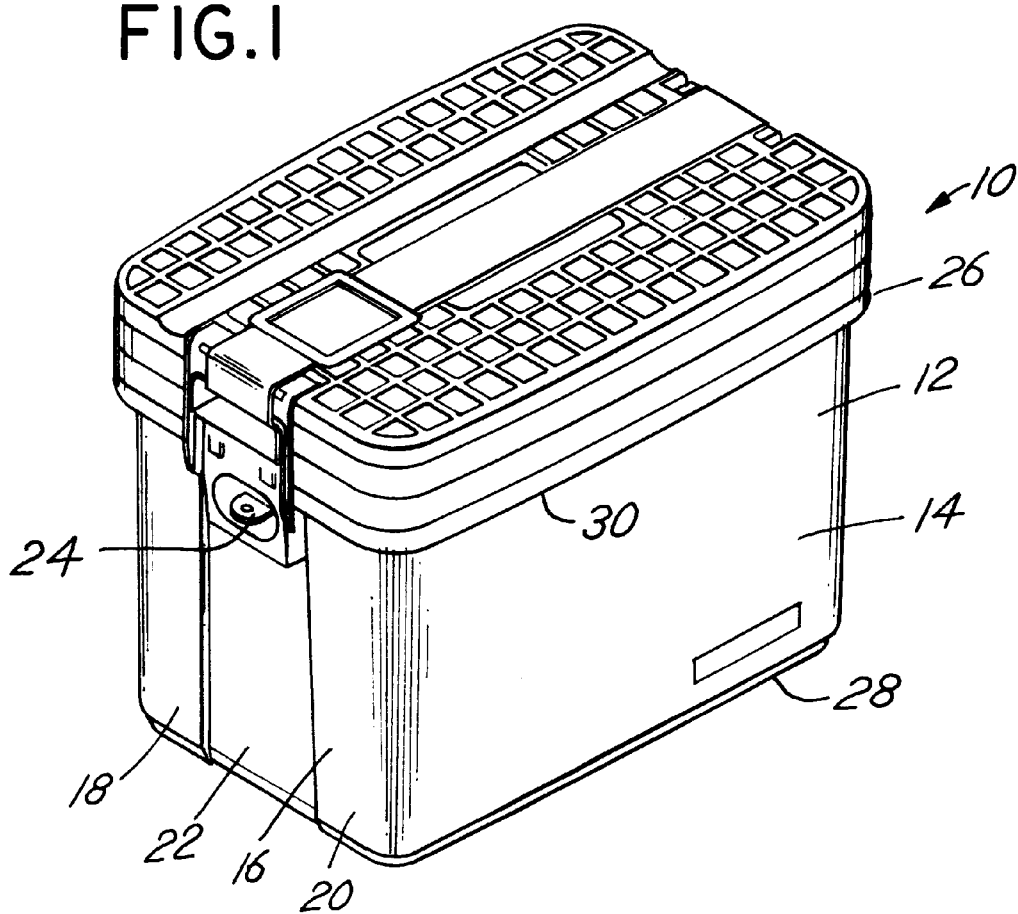
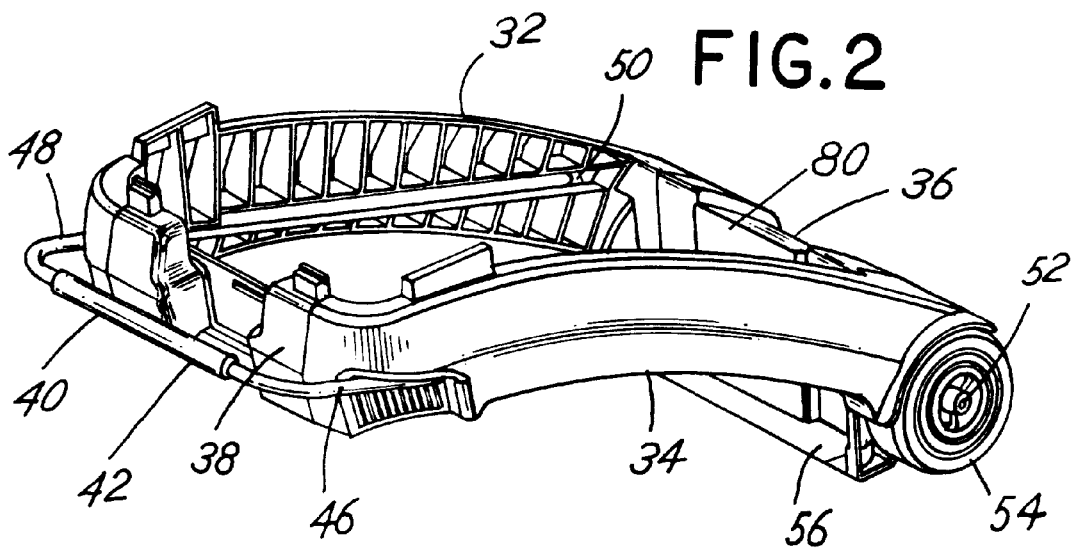

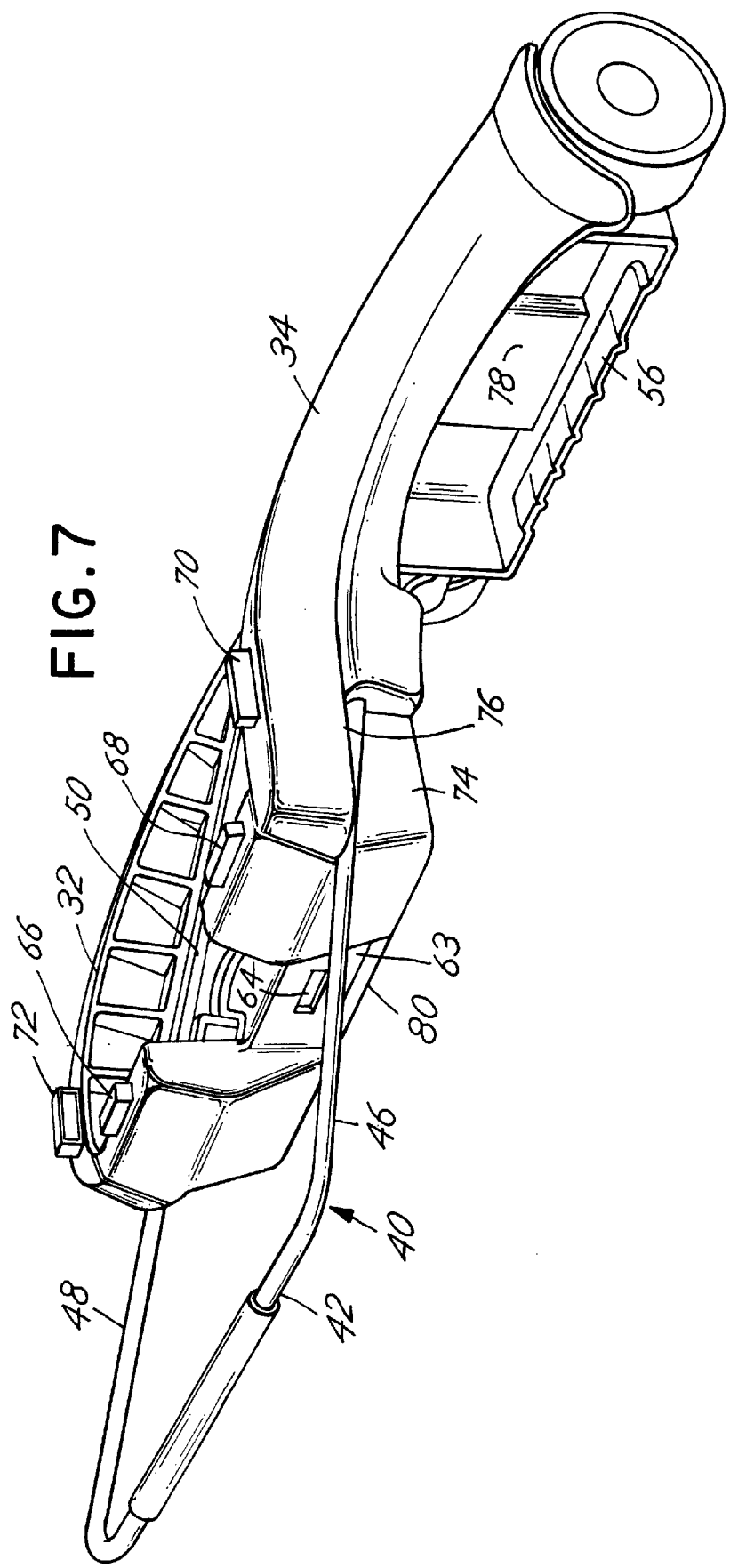

5,988,658

1

TOOL BOX CARRIER

BACKGROUND OF THE INVENTION

This invention relates to a device for supporting and transporting a storage box such as a tool box or the like.

Heretofore, storage boxes or tool boxes have been developed for the home workshop. U.S. Pat. No. 5,518,139 for a Portable Storage Assembly depicts a typical storage or tool box of the type referenced. U.S. Pat. No. 5,518,139 is incorporated herewith by reference.

Movement of such a tool box or storage box from place to place is often a challenging effort because of the weight of the items contained within the box and the bulk of the box itself. Thus there is developed a need to provide some mechanism by which such a tool box may be easily transported or moved from place to place while at the same time not intruding with the operation of the box or its capability of being stored conveniently.

SUMMARY OF THE INVENTION

Briefly, the present invention comprises a carrier for a storage box or tool box. The carrier or caddy is comprised of a circumferential rim which includes an upper, front brace, connecting side braces and a lower or bottom brace or back brace. Wheels are attached to an axle which is integrated with the back brace. The side braces extend upwardly and forwardly to the front brace from the back brace. A handle bar is mounted on the front brace. The sides of the handle bar telescopically project into the side braces. The front brace interlocks with the rim of the tool box.

Thus it is an object of the invention to provide an improved mechanism or device for supporting and transporting a tool box.

It is a further object of the invention to provide a caddy or carrier for a molded tool box wherein the caddy or carrier itself is made from molded plastic materials.

A further object of the invention is to provide a carrier or tool box which has high mobility by virtue of having wheels attached thereto yet which simultaneously is not intrusive to the operation and utility of the tool box.

Another object of the invention is to provide an improved carrier for a tool box which include the telescoping handle to facilitate the ease by which the box may be moved using the carrier or caddy.

Another object of the invention is to provide a tool box carrier or caddy which is attractive, which may be easily stored, which may be easily combined with existing tool boxes, which may be made or formed from molded plastic materials and easily integrated with existing tool boxes, which is easy to use, economical and rugged.

These and other objects, advantages and features of the invention will be set forth in the detailed description which follows.

BRIEF DESCRIPTION OF THE DRAWINGS

In the detailed description which follows, reference will be made to the drawing comprised of the following figures:

FIG. 1 is an isometric view of a typical tool box of the type useful in combination with the subject matter of the present invention;

FIG. 2 is an isometric view of the improved carrier of the invention which is useful in combination with the tool box of FIG. 1;

FIG. 7 is an isometric view of the carrier fully assembled wherein the handle has been moved to the telescoped position.

DESCRIPTION OF THE PREFERRED EMBODIMENT

Figure 3:
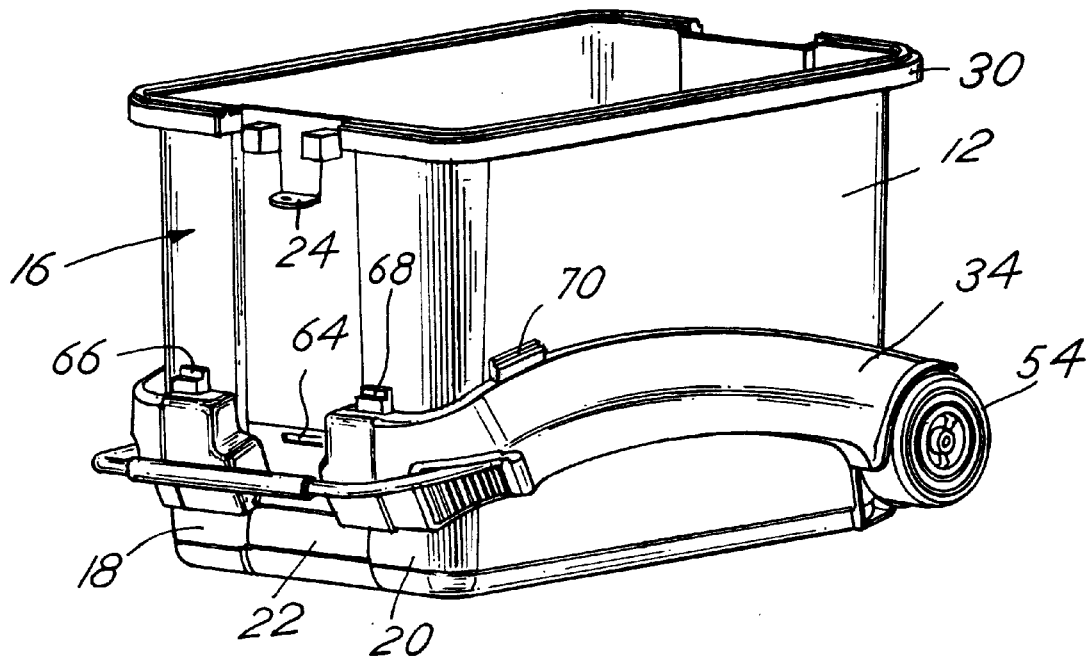
FIG. 3 is an isometric view illustrating the manner in which the tool box of FIG. 1 is combined with the carrier of FIG. 2 wherein the tool box is initially positioned therewith.

FIG. 1 depicts a typical tool box which is useful in combination with the carrier of the present invention. The tool box is depicted in further detail, for example, in U.S. Pat. No. 5,518,139 which is incorporated herewith by reference. However, the particular design of the tool box is not a limiting feature of the invention. Important elements of the carrier and certain features of tool boxes of the type shown in FIG. 1 are described.

Thus the tool box 10 includes a tub 12 having sides such as sides 14 and 16. There is an opposite side to side 14 and an opposite end to the end 16. The end 16 is defined by a pair of parallel panels 18 and 20 separated by a recessed panel section 22. An outwardly projecting tab 24 is positioned within the recessed panel adjacent the top edge 26 of the tub 12. The tub 12 further includes a bottom 28. A circumferential rim 30 includes a channel extending about the upper edge or top 26 of the tub 12. The sides, such as sides 14 and 16, have a draft angle so that the bottom 28 is narrower than the top 26. The tub 12 is the component part of the tool box 10 which interacts principally with the carrier of the invention.

FIG. 2 illustrates the carrier of the invention. The carrier includes opposite side braces 32 and 34. The side braces 32 and 34 are connected by a lower or bottom brace 36 and an upper or front brace 38. A telescoping handle 40 includes a cross bar 42 and side bars 46 and 48. The side bars 46 and 48 telescopically fit into side brace slots such as slot 50 defined on the inside of side brace 32 by way of example. The lower or bottom brace 36 includes a shaft 52 therethrough with wheels 54 attached to the opposite ends of the shaft 52. The back or lower brace 36 further includes a support ledge 56 molded on the inside edge thereof for coaction with the bottom 28 of the tub 12.

Figure 4:
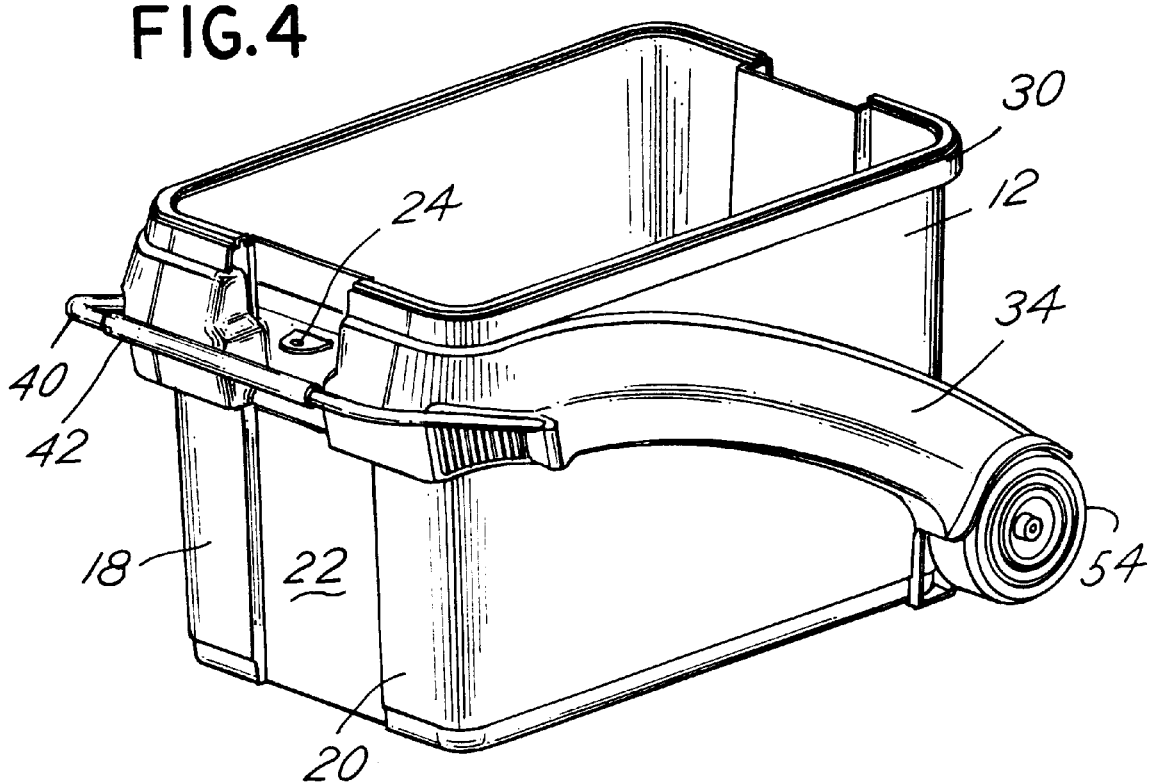
FIG. 4 is an isometric view of the carrier of the invention in combination with the tool box of FIG. 1 and more particularly the tub associated with the tool box of FIG. 1.

The side braces 32 and 34 project forwardly and upwardly from the bottom or back brace 36 and connect to the front cross brace 38. The side braces 32 and 34 thus form an acute angle with a horizontal surface for example or with the bottom 28 of the tub 12 when the tub 12 is combined with the carrier as depicted in FIG. 4.

The front brace 38 includes spaced ribs 58 and 60 which have a recess 62 therebetween. The recess 62 is defined by a plate with a slot 64 in the plate. The slot 64 is adapted to receive the tab 24 associated with the tub 12. This facilitates retention of the tub 12 with the carrier. The inside surfaces of the braces 32, 34, 36 and 38 have a slight draft angle which enables those surfaces to be compatible with the sides, for example, sides 14 and 16, of the tub 12. The cross bar 42 of the handle 40, when in the inward position such as depicted in FIG. 4, is accessible by virtue of the fact that the recess 62 permits manual gripping thereof.

The front cross bar 38 further includes upwardly projecting lugs or tabs such as tabs 66 and 68 which fit with and coact with the channeled rim 30 to further facilitate the engagement of the tub 12 with the carrier.

Figure 6:
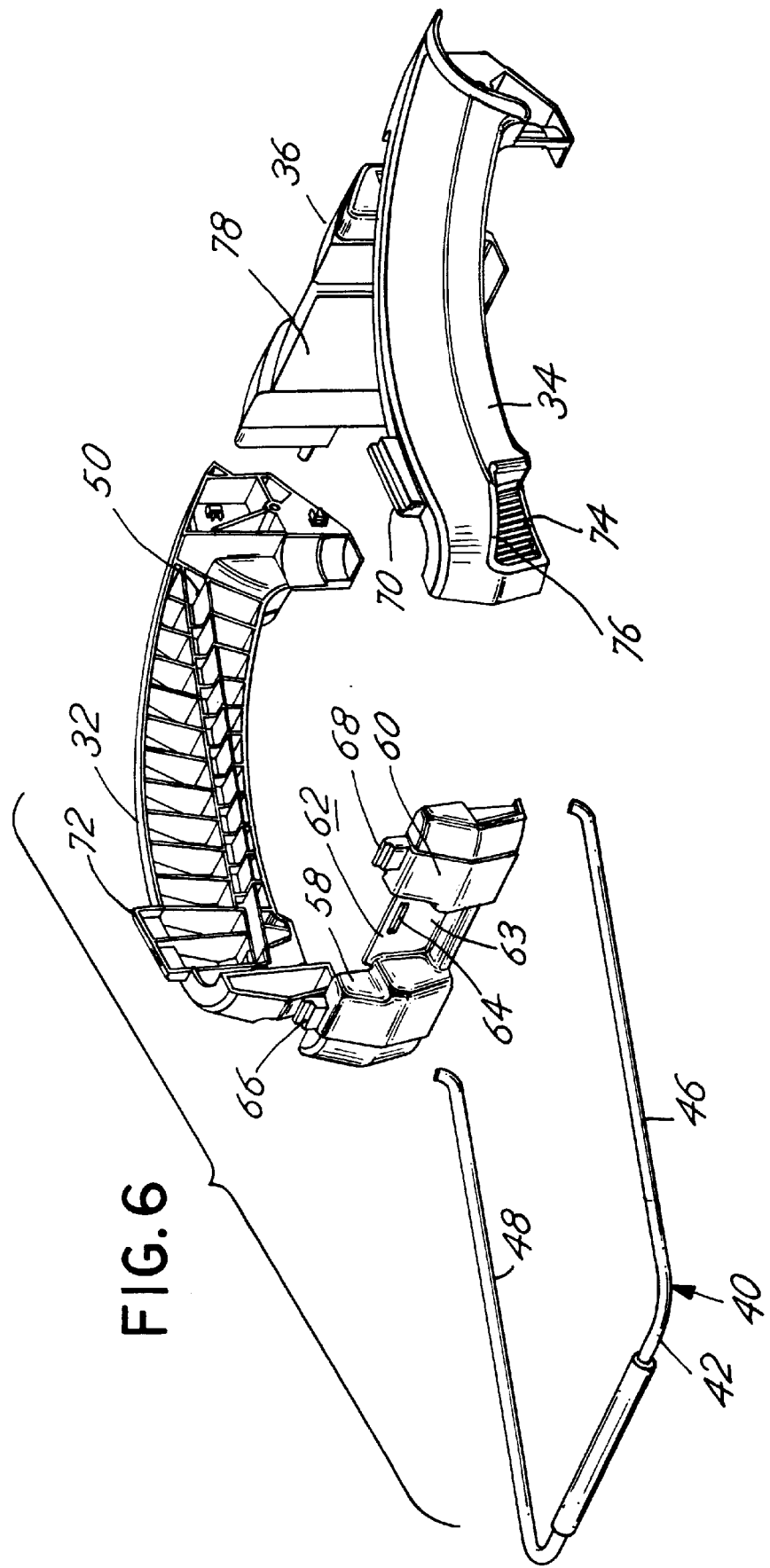
FIG. 6 is an exploded isometric view of the component parts of the carrier without the wheels.

As depicted in FIG. 6, the side braces such as side brace 34 also include shaped tabs such as tab 70 for coaction with the rim 30. Brace 32 includes a tab 72 having a similar function. Note that the side braces 32 and 34 snap fit together with the back or lower brace 36 and front or upper brace 38. Note also that the side braces such as side brace 34 include a channel 74 which defines a land or ledge 76 to facilitate engagement of the side handle 46 and mechanical support of the carrier and tub 12 when fully assembled.

Figure 5:
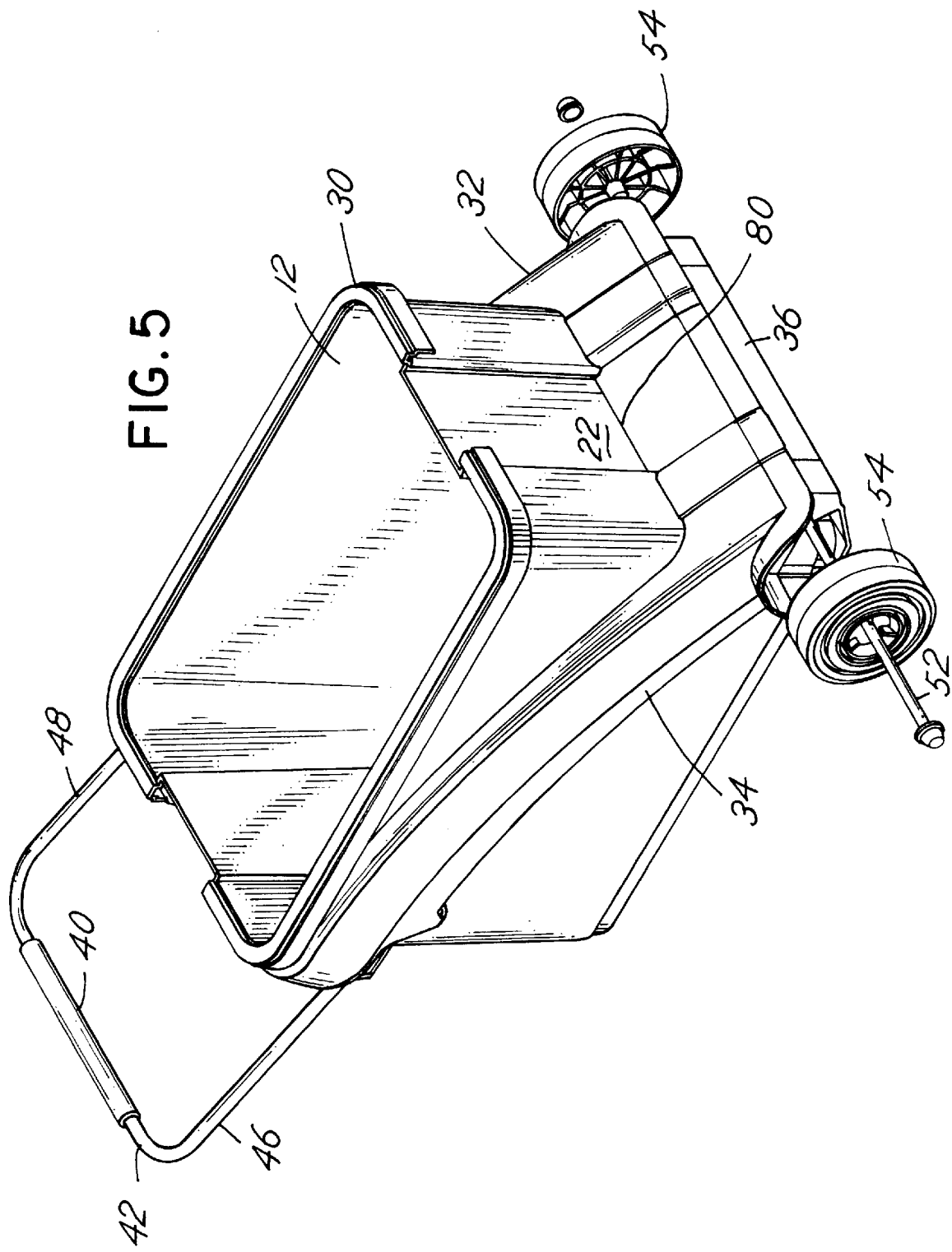
FIG. 5 is an isometric view from another direction of the assembly of FIG. 4 wherein the wheels are depicted as partially exploded and not assembled fully to the carrier.

FIG. 3 illustrates that the tub 12 may be inserted into the carrier defined by the various braces 32, 34, 36 and 38 and that the molded tub 12 and more particularly the recessed panel 22 may be flexed so that the lock tab 24 may be fitted through the slot 64. It should also be noted that the tub 12 has a profile which is more evident by reference to FIG. 5 wherein that profile is defined not only by the sides 14 and 16 but by the recesses 22. The braces and in particular the back end and front end braces 36 and 38 are molded so as to have projections or define a profile which is generally congruent with the profile of the tub 12. Thus the back brace 36, depicted in FIGS. 2 and 5, includes a molded section 80 which fits into the recess 22 defined in the tub 12. All of these interactions of the various component parts so described enable the carrier as constructed to slidably receive and retain the tub 12. The tub 12 thus is snugly and economically retained.

The handle of 40 may be telescopically pulled from the side braces 32 and 34 and the assembly may then be rolled or moved to another place. Tub 12 is supported and retained on the ledge 56 and is also supported by the braces 32, 34, 36 and 38. The various tabs such as tabs 68 further help retain the tub 12.

Various alternative constructions may be provided within the spirit and scope of the invention. The invention, therefore, is to be limited only by the following claims and their equivalent.

We claim:

1. A separable carrier for a storage box, said box including a generally rectangular tub with sides forming the tub and having a circumferential tub rim, and a generally uniform profile horizontal section, the tub having a top and a bottom, said carrier formed to encircle the tub and support the tub, said carrier comprising in combination:

a four-sided molded plastic support ring including a front cross brace, a back cross brace, first and second side braces spaced from one another and connecting the front brace and back brace to form the support ring, the braces defining in combination an internal profile in horizontal section congruent with the profile of the tub for slidably receiving the tub, said carrier being separate from the box;

said side braces defining an acute angle on tub sides extending upwardly from the back cross brace adjacent the bottom at one end of the tub to the top of the tub at the opposite end of the tub, the front cross brace including at least one tub rim engagement member and the back brace including a tub engaging member, said engaging members, in combination retaining the box from sliding totally through the ring by engaging the box;

a handle bar including a cross handle and generally parallel, spaced legs extending from the ends of the cross handle, said legs each telescopically, slidably mounted in one of the first and second side braces, said handle bar having a first storage position with the handle positioned against the front cross brace and the legs slidably inserted in the side cross braces and a second, extended position with the handle spaced from the front cross brace and the legs extended from the side braces to form a pulling handle; and wheels affixed on the opposite sides of the support ring adjacent the lower cross brace.

2. The carrier of claim 1 including a bottom support ledge of the back cross brace for supporting the bottom of the tub.

3. The carrier of claim 1 including a slot in the front brace, said tub including a side with a projecting tab which may be engaged with the slot.

4. The carrier of claim 1 wherein the rim of the tub comprises a channel and the front brace includes a projecting rib for engagement in the channel.

5. The carrier of claim 1 wherein the front brace includes a central recess defined by spaced ribs on each side of the recess, said cross handle being fitted against the ribs in the handle bar retracted position and accessible at the central recess for manual operation.

* * * * *